United States Patent
Olsen (10) Patent No.: US 9,882,423 B2
(45) Date of Patent: Jan. 30, 2018

(54) UNINTERRUPTIBLE POWER SUPPLY CONTROL

(71) Applicant: SCHNEIDER ELECTRIC IT CORPORATION, West Kingston, RI (US)

(72) Inventor: Richard Dyrmose Olsen, Kolding (DK)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 0 days.

(21) Appl. No.: 15/035,644

(22) PCT Filed: Nov. 14, 2013

(86) PCT No.: PCT/US2013/070039
§ 371 (c)(1),
(2) Date: May 10, 2016

(87) PCT Pub. No.: WO2015/072999
PCT Pub. Date: May 21, 2015

(65) Prior Publication Data
US 2016/0276870 A1  Sep. 22, 2016

(51) Int. Cl.
*H02M 1/42* (2007.01)
*H02M 3/04* (2006.01)
(Continued)

(52) U.S. Cl.
CPC .............. *H02J 9/061* (2013.01); *H02J 9/062* (2013.01); *H02M 1/42* (2013.01); *H02M 3/04* (2013.01); *H02M 7/04* (2013.01); *H02M 7/44* (2013.01)

(58) Field of Classification Search
CPC ............ H02J 9/061; H02J 9/062; H02M 3/04; H02M 1/42; H02M 7/04; H02M 7/44
(Continued)

(56) References Cited

U.S. PATENT DOCUMENTS

| | | |
|---|---|---|
| 5,315,533 A | 5/1994 | Stich et al. |
| 5,612,580 A | 3/1997 | Janonis et al. |

(Continued)

FOREIGN PATENT DOCUMENTS

| | | |
|---|---|---|
| CN | 1930754 A | 3/2007 |
| JP | H08154347 A | 6/1996 |

(Continued)

OTHER PUBLICATIONS

Notification of Transmittal of the International Search Report and the Written Opinion of the International Searching Authority from corresponding PCT/US2013/070039 dated Apr. 9, 2014.

(Continued)

*Primary Examiner* — Brandon S Cole
(74) *Attorney, Agent, or Firm* — Lando & Anastasi, LLP (57) ABSTRACT

Systems and methods of controlling an uninterruptible power supply are provided. In one aspect, an uninterruptible power supply includes a first input configured to receive input power from a first power source, a second input configured to receive input power from a second power source, an output configured to provide output power to a load derived from power from at least one of the first power source and the second power source, a power conversion circuit coupled with the first input, the second input and the output, and a controller coupled with the power conversion circuit. The controller is configured to control the power conversion circuit to provide an output voltage of the output power at a first voltage level, and to control the power (Continued)

conversion circuit to provide an output voltage of the output power at substantially a second voltage level.

17 Claims, 4 Drawing Sheets

(51) Int. Cl.
   *H02M 7/04* (2006.01)
   *H02M 7/44* (2006.01)
   *H02J 9/06* (2006.01)

(58) Field of Classification Search
   USPC .................................................. 307/43–87
   See application file for complete search history.

(56) References Cited

U.S. PATENT DOCUMENTS

| | | | |
|---|---|---|---|
| 5,982,652 A | 11/1999 | Simonelli et al. | |
| 6,191,500 B1* | 2/2001 | Toy | H02J 3/46 307/64 |
| 6,268,665 B1* | 7/2001 | Bobry | G01R 31/362 307/66 |
| 6,906,435 B1* | 6/2005 | Lin | H02J 9/062 307/64 |
| 7,259,477 B2 | 8/2007 | Klikic et al. | |
| 7,432,615 B2* | 10/2008 | Hjort | H02J 9/062 307/64 |
| 7,446,433 B2 | 11/2008 | Masciarelli et al. | |
| 8,212,401 B2* | 7/2012 | Linkhart | H02J 9/06 307/64 |
| 8,803,361 B2* | 8/2014 | Johansen | H02J 9/062 307/64 |
| 9,362,781 B2* | 6/2016 | Costa | H02J 9/00 |
| 9,634,512 B1* | 4/2017 | Kim | H02J 7/0072 |
| 2003/0048004 A1* | 3/2003 | Fleming | H02J 3/005 307/64 |
| 2006/0043792 A1* | 3/2006 | Hjort | H02J 9/062 307/1 |
| 2006/0043797 A1* | 3/2006 | Hjort | H02J 7/0047 307/46 |
| 2006/0072283 A1* | 4/2006 | Thompson | G06F 1/30 361/600 |
| 2009/0033154 A1* | 2/2009 | Linkhart | H02J 9/06 307/65 |
| 2010/0280676 A1 | 11/2010 | Pabon et al. | |
| 2010/0295374 A1* | 11/2010 | Nielsen | H02J 9/062 307/66 |
| 2010/0315034 A1 | 12/2010 | Lu et al. | |
| 2011/0115294 A1* | 5/2011 | Gallegos-Lopez | H02M 1/10 307/52 |
| 2011/0187197 A1* | 8/2011 | Moth | H02J 9/062 307/66 |
| 2011/0305049 A1* | 12/2011 | Raptis | H02J 9/062 363/34 |
| 2012/0181971 A1* | 7/2012 | Birkeland | H01L 35/00 320/101 |
| 2012/0280645 A1 | 11/2012 | Olsson et al. | |
| 2014/0197689 A1* | 7/2014 | Shih | H02J 9/06 307/66 |

FOREIGN PATENT DOCUMENTS

| | | |
|---|---|---|
| JP | 2010124557 A | 6/2010 |
| JP | 2011135708 A | 7/2011 |

OTHER PUBLICATIONS

Extended European Search Report from corresponding Euorpean Application No. 13897382.1 dated Jul. 3, 2017.

* cited by examiner

UNINTERRUPTIBLE POWER SUPPLY CONTROL

CROSS-REFERENCE TO RELATED APPLICATIONS

This application is a U.S. National Stage Application under 35 U.S.C. §371 of International Application No. PCT/US2013/070039, filed Nov. 14, 2013, titled UNINTERRUPTIBLE POWER SUPPLY CONTROL, which is hereby incorporated herein by reference in its entirety.

BACKGROUND

Field of Invention

At least one embodiment of the present invention relates generally to control of an uninterruptible power supply.

Discussion of Related Art

Uninterruptible power supplies (UPSs) are used to provide reliable power to many different types of electronic equipment. Uninterruptible power supplies regulate power provided to a load, and can provide backup power to a load in the event of a loss of primary power, such as during black out or brown out conditions. In addition to providing power to loads, some power is used in the operation of a UPS, reducing the overall efficiency of the UPS.

SUMMARY

At least one aspect of the invention is directed to an uninterruptible power supply. The uninterruptible power supply includes a first input configured to receive input power from a first power source, a second input configured to receive input power from a second power source, an output configured to provide output power to a load derived from power from at least one of the first power source and the second power source, a power conversion circuit coupled with the first input, the second input and the output; and a controller coupled with the power conversion circuit. The controller is configured in a first mode of operation to control the power conversion circuit to provide an output voltage of the output power at substantially a first voltage level, and in a second mode of operation to control the power conversion circuit to provide an output voltage of the output power at substantially a second voltage level, with the second voltage level being less than the first voltage level.

In the uninterruptible power supply, the controller may be configured, in the second mode of operation, to provide power at the output derived from the second power source. The controller may be configured in the first mode of operation to provide power at the output derived solely from the first power source. The controller may be configured to generate a profile of the load, and to set the second voltage level based on the profile. The controller may be configured to generate the profile of the load by outputting a nominal voltage to the load, changing the nominal voltage by a known amount, and detecting a change in current drawn by the load. The second power source may be a battery, and the uninterruptible power supply may include the battery. The controller may be further configured to detect that a capacity of the load has changed by a threshold amount, and in response to the detection, generate an updated profile of the changed load. The controller may be further configured to modify the second voltage based on the updated profile.

In another aspect, a method is provided for controlling an uninterruptible power supply having a first input configured to receive input power from a first power source, a second input configured to receive input power from a second power source, an output configured to provide output power to a load derived from power from at least one of the first power source and the second power source. The method includes in a first mode of operation, controlling the uninterruptible power supply to provide an output voltage of the output power at substantially a first voltage level, and in a second mode of operation, controlling the uninterruptible power supply to provide an output voltage at substantially a second voltage level, with the second voltage level being less than the first voltage level.

The method may further include providing power at the output derived from the second power source in the second mode of operation. The method may also include providing power at the output derived solely from the first power source in the first mode of operation, and generating a profile of the load, and setting the second voltage level based on the profile. Generating a profile may include outputting a nominal voltage to the load, changing the nominal voltage by a known amount, and detecting a change in current drawn by the load. The second power source may be a battery, and the method may further include providing power to the load solely from the battery in the second mode of operation. The method may further include detecting that a capacity of the load has changed by a threshold amount, and in response to the detection, generating an updated profile of the changed load, and modifying the second voltage based on the updated profile.

Another aspect is directed to an uninterruptible power supply (UPS) system that includes a first input configured to receive input power from a first power source, a second input configured to receive input power from a second power source, an output configured to provide output power to a load derived from power from at least one of the first power source and the second power source, and means for controlling an output voltage of the UPS system including means for detecting that output power is being provided by the second power source, and in response, reducing an output voltage of the UPS system to a reduced voltage level.

The UPS may further include means for detecting a profile of the load and for adjusting the reduced power level based on the profile. In the UPS, the second power source may be a battery, and the UPS may include the battery. The UPS may further include means for detecting a change in a characteristic of the load and updating the profile based on the change.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

An uninterruptible power supply (UPS) can include an inverter with an adaptive inverter regulator, which can adjust an output voltage of the inverter to a load to extend runtime of a battery. The adjusting of the output can be based on a selection of a setting of the adaptive inverter regulator and a profile of the load. By lowering the output root mean square (RMS) voltage of the inverter within an acceptable threshold of the load, the runtime of the battery can be extended.

Examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular may also embrace examples including a plurality, and any references in plural to any example, component, element or act herein may also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
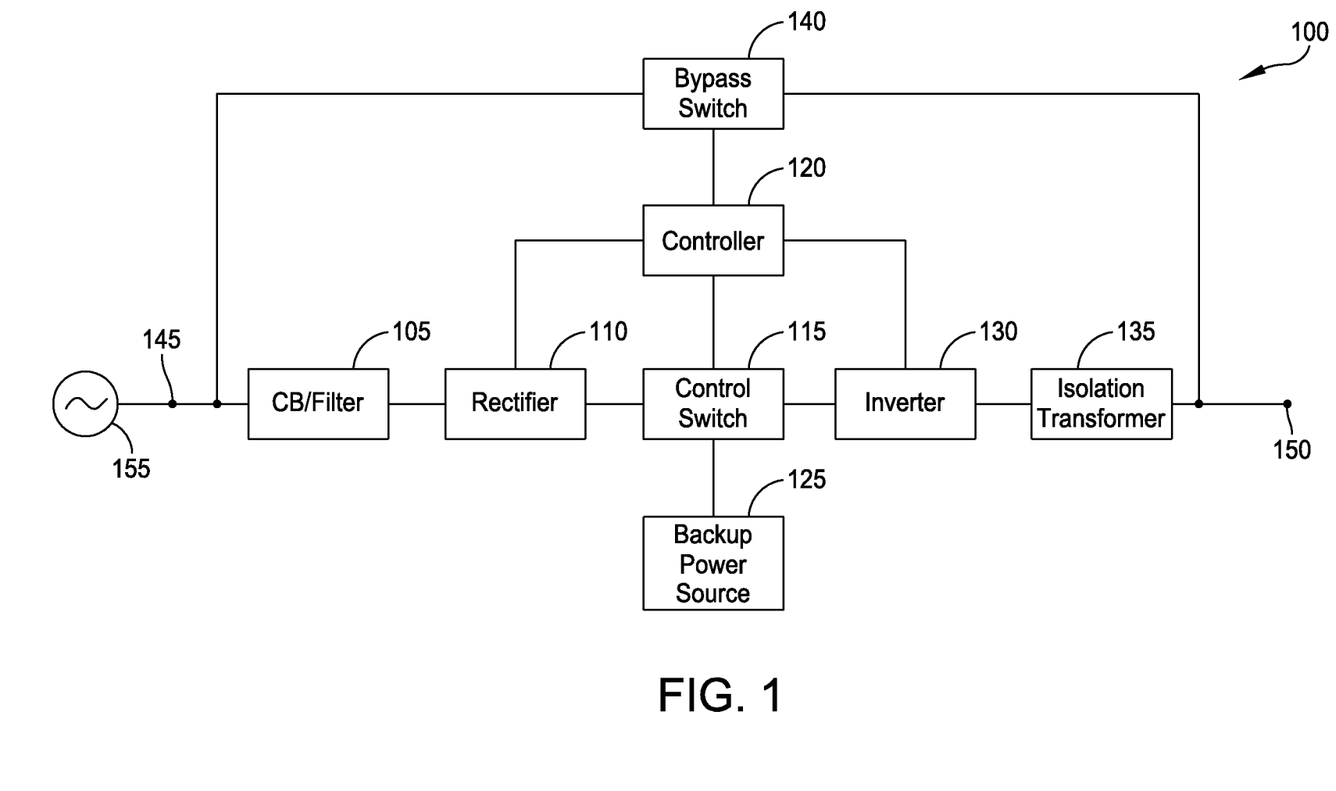
FIG. 1 is a functional block diagram depicting an example uninterruptible power supply in accordance with an embodiment.

FIG. 1 is a functional block diagram 100 depicting an uninterruptible power supply (UPS) 100. The uninterruptible power supply 100 includes power conversion circuitry such as a circuit breaker/filter 105, a rectifier 110, a control switch 115, a controller 120, a backup power source 125, an inverter 130, a transformer such as an isolation transformer 135, and a bypass switch 140. The uninterruptible power supply 100 also includes at least one input 145 and output 150. The input 145 couples an AC power source 155 (e.g., grid power) with the uninterruptible power supply 100, and the output 150 couples the uninterruptable power supply 100 with a load.

The UPS 100 of FIG. 1 may be referred to as a double conversion UPS. Aspects described herein are not limited for use with double conversion UPS's, but may be used with other UPS topologies as well.

In one embodiment, the circuit breaker/filter 105 receives power from the AC power source 155 via the input 145, filters the input power, and provides filtered power to the rectifier 110. The rectifier 110 rectifies the filtered power, and provides rectified power to the control switch 115. The UPS 100 can also include a power factor correction circuit, which can include the rectifier 110 and/or the circuit breaker/filter 105. The control switch 115 receives the rectified power from the rectifier 110, and receives DC power from the backup power source 125, such as a battery or fuel cell. Under the control of the controller 120, the control switch 115 provides power from the rectifier 110 to the inverter 130. For example, the controller 120 changes the state of the control switch 115 to couple the rectifier 110 with the inverter 130 when the controller 120 determines that the output power of the rectifier 110 is within a tolerance range. In some embodiments, the controller 120 determines that the output power of the rectifier 110 is outside a tolerance range, for example, during a black out or brown out condition. In this example, the controller 120 operates control of the switch 115 to provide DC power from the backup power source 125 to the inverter 130 directly or via intervening components such as the rectifier 110. The uninterruptible power supply 100 provides power at the output 150 for a load via the backup power source 125 during failure of the AC power source 155.

The inverter 130 receives DC power output from the rectifier 110 or the backup power source 125, converts the DC power to AC power, and regulates the AC power. In some embodiments where the uninterruptible power supply 100 includes the isolation transformer 135, the inverter 130 provides regulated AC power to the isolation transformer 135. The isolation transformer 135 increases or decreases the voltage of the AC power output from the inverter 130, and provides isolation between the uninterruptible power supply 100 and a load.

In some embodiments, the bypass switch 140 couples the AC power source 155 or the input 145 with the output 150, bypassing at least some components of the uninterruptible power supply 100, (e.g., the rectifier 110) to provide power to the output 150 in a bypass mode of operation. For example, the controller 120 controls the bypass switch 140 to operate in the bypass mode when the power quality from the AC power source 155 is within a tolerance range, or when there is a failure of the rectifier 110 or other component of the uninterruptible power supply 100. In some embodiments, the controller 120 operates the UPS 100 in various modes, depending on the quality of the input power. For example, the UPS 100 runs in bypass mode if the quality of the input power is above a first threshold and runs off of the backup power source if the quality of the input power is below a second threshold. It is desirable to operate in bypass mode when possible, as it is the most energy efficient. However, if the quality of the power is too low, the load may be at risk of damage. Further, low quality power or a drop in quality of power may indicate that a grid failure may be more likely to occur, in which case running from the backup power source before the grid fails can prevent damage or power interruption to the load.

In some embodiments, the controller 120 includes at least one processor or other logic device. In some embodiments, the controller 120 includes a digital signal processor (DSP). The controller 120 may also include at least one field programmable gate array (FPGA) and an application specific integrated circuit (ASIC), or other hardware, software, firmware, or combinations thereof. In various embodiments, one or more controllers may be part of the UPS 100, or external to but operatively coupled with the UPS 100.

The UPS 100 includes adaptive inverter regulation, which can be implemented by the controller 120. The adaptive inverter regulation can have multiple settings to which the user can set a selection of the setting to vary how aggressively the inverter is regulated. For example, the selections of the setting can be one of "off," "low," "medium," and "high." More or fewer selection settings can be provided. The higher selection can allow for the controller 120 to adjust the inverter 130 to a greater extent in order to potentially extend the runtime of the backup power source 125 for a longer duration. The controller 120 can extend the runtime of the backup power source 125 by lowering the output voltage of the UPS 100 within parameters that are acceptable to a load coupled to the output 150. The acceptable parameters can be determined by profiling the load, as described further below.

Figure 2A:
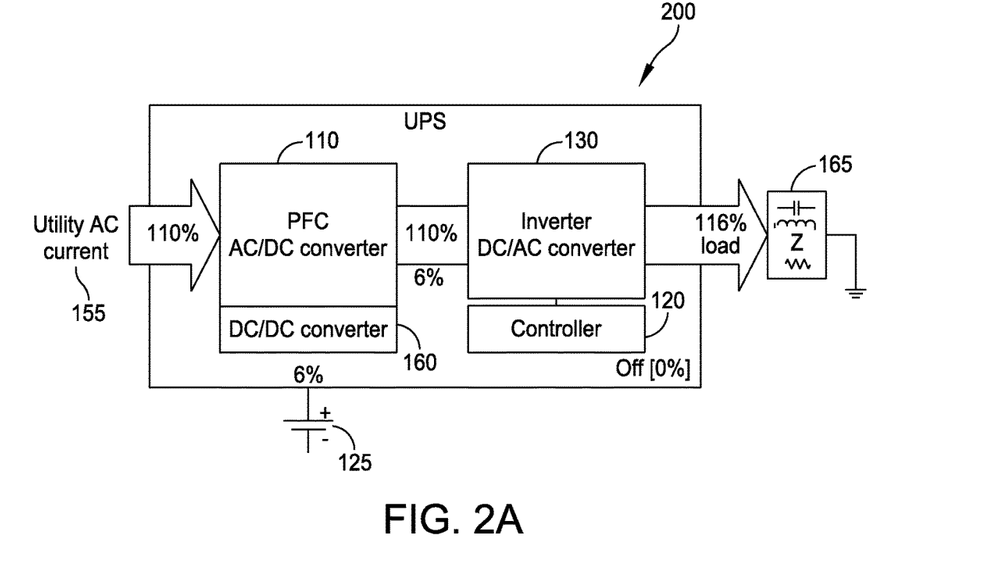
FIG. 2A is a functional block diagram depicting an example uninterruptible power supply in accordance with an embodiment.

FIG. 2A is a functional block diagram of an example mode of operation of a UPS 200, which is similar to UPS 100, and similar components are identified with the same reference numbers. FIG. 2A shows the UPS 200 running in an overload mode of operation, with no adaptive inverter regulation, such as when the setting selection of the adaptive inverter regulation is set to "off." The UPS 200 provides power to a load 165, which can include multiple load components. The power is received both from the AC power source 155, as well as the backup power source 125. As the UPS 200 is running in an overload mode, the UPS 200 receives 110% of a load capacity of the UPS 200 from the AC power source 155 via the rectifier 110. The UPS 200 also receives 6% of the load capacity of the UPS 200 from the backup power source 125 via a DC/DC converter 160. The UPS 200 provides both sources of power, totaling 116% to the inverter 130. In the Example of FIG. 2A, the adaptive inverter regulation is turned off, and the UPS 200 provides all 116% of the received power to the load 165. In this example, at some point, when the backup power source is a battery, depending on battery capacity and the power draw of the load, the battery will drain requiring the UPS to enter a bypass operation, or to shut off, if AC power becomes unavailable.

Figure 2B:
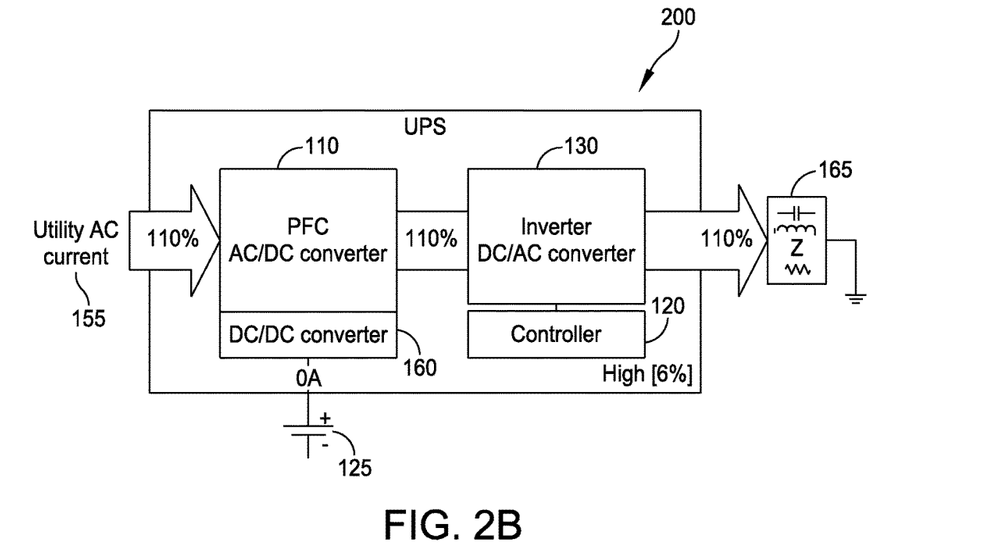
FIG. 2B is a functional block diagram depicting an example uninterruptible power supply in accordance with an embodiment.

FIG. 2B is a functional block diagram of another example mode of operation of the UPS 200. FIG. 2B shows the UPS 200 running in the overload mode of operation as shown in FIG. 2A, but with the adaptive inverter regulation turned on. In this example, the adaptive inverter regulation is set to "high." In some embodiments, "low" can correspond to a 2% reduction of output voltage, "medium" can correspond to a 4% reduction of output voltage, and "high" can correspond to a 6% reduction of output voltage. Other percentages can be used, along with more or fewer setting selections. As the adaptive inverter regulation is set to "high," the inverter 130 can be adjusted to output a voltage that is 6% less than that of FIG. 2A. Thus, the UPS 200 can receive 110% of the load capacity from the AC power source 155, and is able to power the load without using power from the backup power source 125. In the Example of FIG. 2B, the UPS can continue to power the load without draining a battery used as the backup power source.

Figure 3A:
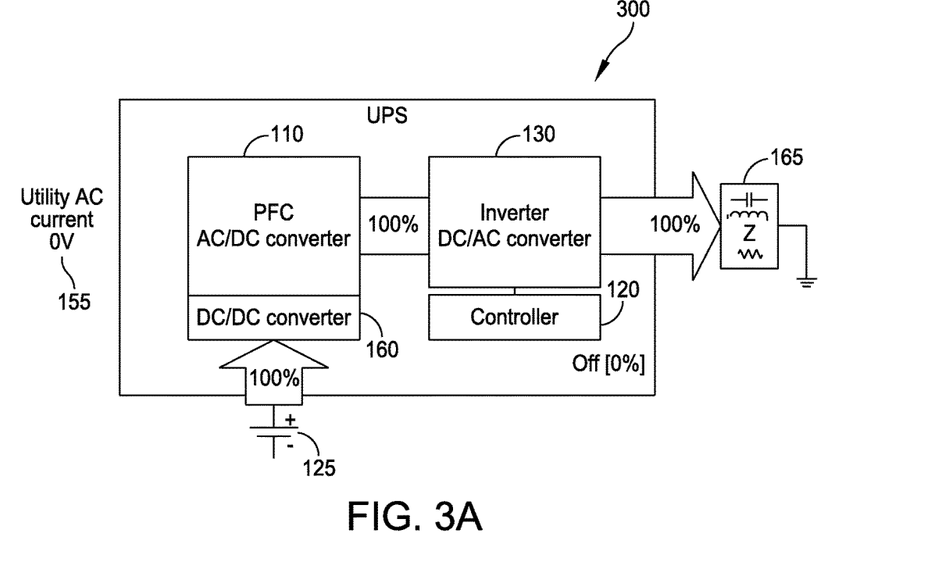
FIG. 3A is a functional block diagram depicting an example uninterruptible power supply in accordance with an embodiment.

FIG. 3A is a functional block diagram of another example mode of operation of the UPS 200. FIG. 3A shows the UPS 200 running in a backup power source mode of operation, receiving no power from the AC power source 155. Rather, the UPS 200 receives 100% of the power for the load from the backup power source 125. The UPS 200 receives DC power from the backup power source 125 at the DC/DC converter 160. The DC/DC converter 160 converts the power and provides the power to the inverter 130. As the UPS 200 is running with the adaptive inverter regulation turned off, the inverter 130 converts the DC power to AC power and provides a full 100% voltage to the load 165. As the backup power source 125 provides power to the load 165 and depletes, the backup power source will have a specific runtime before the backup power source 125 runs out of power. The specific runtime will depend on the amount of power initially stored in the backup power source 125, as well as the amount of power drawn by the load 165.

Figure 3B:
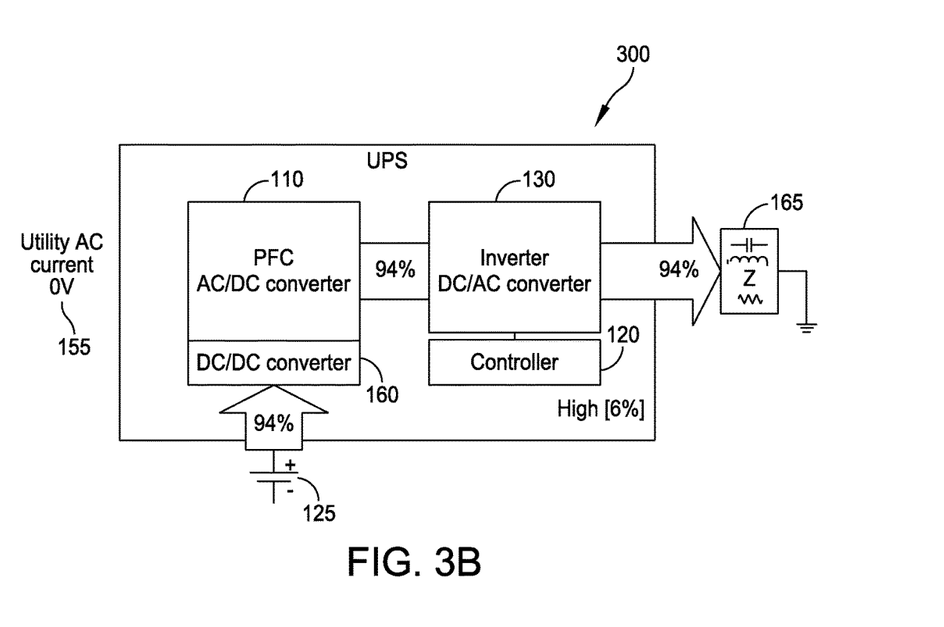
FIG. 3B is a functional block diagram depicting an example uninterruptible power supply in accordance with an embodiment.

FIG. 3B is a functional block diagram of another example mode of operation of the UPS 200. FIG. 3B shows the UPS 200 running in the backup power source mode of operation as in FIG. 3A, but with the adaptive inverter regulation set to "high." In some embodiments, a "high" setting results in a 6% decrease in output voltage. Depending on the type of load, such a decrease in output voltage does not compromise safe operation of the load 165. Also depending on the type of load, such a decrease can result in a corresponding decrease in current drawn by the load 165. For example, for a passive load, the 6% decrease in output voltage can result in a 6% decrease in current drawn by the load 165, so that the runtime of the backup power source 125 can increase by 12% or more.

In one embodiment, the UPS 200 can generate a profile of the load 165 to determine the increase in runtime of the backup power source 125 that would correspond to each of the settings of the adaptive inverter regulation. The UPS 200 can generate the load profile by outputting a nominal voltage to the load 165. The UPS 100 can then change the voltage output to the load 165 by a known amount, and then measure the change in current produced by such a change in voltage. The load profile can provide information related to whether the load 165 is active or passive or a mix of both. The load profile can also be used to calculate the battery runtime based on the adjustments made to the inverter 130 and the output voltage.

The profile of the load 165 can also be used to configure each of the selection settings. For example, the UPS 200 can determine a maximum safe reduction of RMS input voltage to the load 165 and change the percentage adjustment of each of the selection settings based on the maximum safe reduction. In some embodiments, the UPS 200 can set the "high" setting to be half the maximum safe reduction and scale the other settings accordingly. For instance, if the load 165 can safely receive an RMS voltage of 10% less, the UPS 200 can set the "high" setting for the adaptive inverter regulation to be 5%, and correspondingly, the "medium" setting to be 3% and the "low" setting to be 1.5%. Other appropriate algorithms can be used to set the selection settings, such as having a minimum percentage for the "low" setting or other such factors. Alternatively or additionally, the percentages of the settings can be configured by the user, either by manually entering the settings in the UPS or from a remote computer over a network interface of the UPS 200.

In some embodiments, the profile of the load 165 can be affected by an output current limit set on the UPS 200. For example, if the load 165 includes active load components, reducing the output voltage of the UPS 200 can result in an increase in current drawn by the load 165. The UPS 200 can generate a load profile that takes the output current limit into consideration and/or configure the percentages of the selection settings of the adaptive inverter regulation to maximize runtime of the backup power source 125 without exceeding the UPS output current limit.

In some embodiments, the load profile can be used to determine that the increase in runtime of the backup power source 125 is below a threshold. For example, if the load 165 includes primarily active load components, the increase in runtime of the backup power source 125 by decreasing the output voltage can be minimal. A threshold, such as 1%, can be used to compare the expected runtime increase. If the expected runtime increase does not meet the threshold, in some embodiments, the UPS 100 can suspend the adaptive inverter regulation.

In some embodiments, based on the load profile and the expected runtime of the backup power source 125, the backup power source 125 can be replaced with a smaller backup power source, such as a smaller battery. For example, if a threshold amount of runtime is desired for the load 165 from the backup power source 125, if the expected runtime is extended enough based on the load profile, a smaller battery can be used that still meets the threshold amount of runtime, allowing the UPS 200 to utilize less space and/or cost less.

Figure 4:
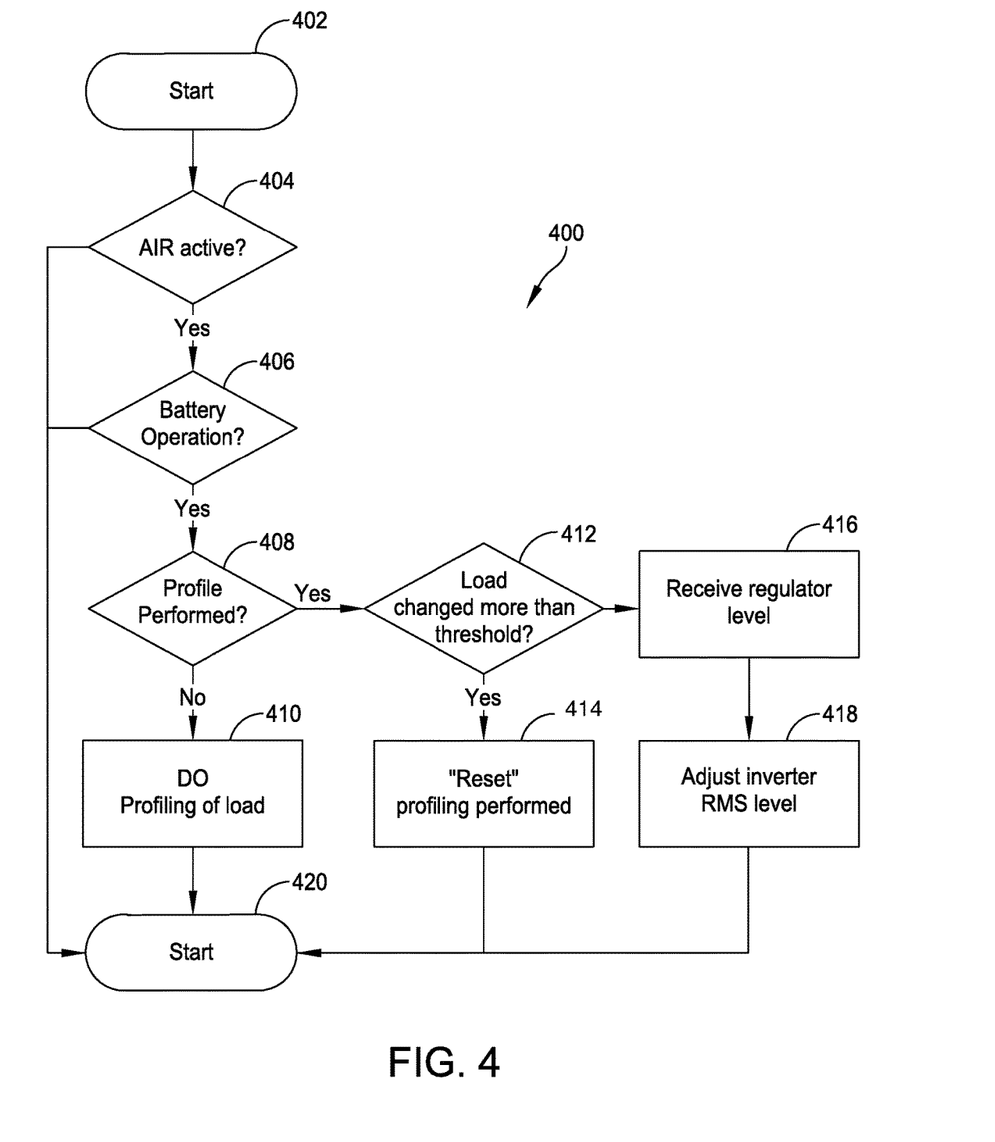
FIG. 4 is a flow chart showing an example process in accordance with an embodiment.

FIG. 4 is a flow chart of an example process 400 of the UPS 200. At act 402, the process starts. At act 404, the UPS 100 determines whether the adaptive inverter regulation is active. The adaptive inverter regulation can be inactive for various reasons, such as the selection setting set to "off," or from expected runtime increases not meeting a threshold, as described earlier. If the adaptive inverter regulation is inactive, the process 400 can exit at act 420. If the adaptive inverter regulation is active, the UPS 200 determines whether the UPS 200 is running in battery operation at act 406. The battery operation can include any mode of operation of the UPS 200 where power is drawn from the backup power source 125, whether power is also being received from the AC power source 155 or not.

If the UPS 200 is not running in battery operation, the process 400 exits at act 420. If the UPS 200 is running in battery operation, the UPS 100 determines whether a load profile has been performed at act 408. If the load profile has not been performed, the UPS 200 generates a load profile at act 410. The load profile can be generated as described above to determine expected battery runtime increases as well as to determine percentage decreases in output voltage for each of the selection settings.

If the load profile has been performed, at act 412, the UPS 100 can determine whether the load 165 coupled to the UPS 200 has changed by more than a threshold amount. For example, if the threshold amount is 10%, the UPS 200 can determine whether a capacity of the load 165 has changed by 10% or more. If the load 165 has changed by more than the threshold amount, at act 414 the UPS 200 can reset the load profile and profile the load again.

If the load has not changed by at least the threshold amount, the UPS 200 receives the selection of the adaptive inverter regulation setting at act 416. Based on the selection of the setting and the profile of the load, the UPS 200 adjusts the output RMS voltage of the inverter 130 at act 418, as described above. At act 420, the process 400 exits.

At least some embodiments described herein may be used with several different types of UPS's, include online, offline, line interactive, double conversion, and those utilizing delta converters, to provide extended runtime capabilities while still providing sufficient output power for critical loads. UPS's in accordance with embodiments may operate as single phase or multiple phase devices and at a variety of voltage levels.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An uninterruptible power supply, comprising:
a first input configured to receive input power from a first power source;
a second input configured to receive input power from a second power source;
an output configured to provide output power to a load derived from power from at least one of the first power source and the second power source;
a power conversion circuit coupled with the first input, the second input and the output; and
a controller coupled with the power conversion circuit, the controller configured to:
in a first mode of operation, control the power conversion circuit to provide an output voltage of the output power at substantially a first voltage level;
generate a profile of the load;
in a second mode of operation, control the power conversion circuit to provide an output voltage of the output power at substantially a second voltage level, with the second voltage level being less than the first voltage level and based on the profile of the load;
detect that a capacity of the load has changed by a threshold amount; and
in response to the detection, generate an updated profile of the changed load.

2. The uninterruptible power supply of claim 1, wherein the controller is configured, in the second mode of operation, to provide power at the output derived from the second power source.

3. The uninterruptible power supply of claim 2, wherein the controller is configured in the first mode of operation to provide power at the output derived solely from the first power source.

4. The uninterruptible power supply of claim 2, wherein the controller is configured to generate the profile of the load by:
outputting a nominal voltage to the load;
changing the nominal voltage by a known amount; and
detecting a change in current drawn by the load.

5. The uninterruptible power supply of claim 1, wherein the second power source is a battery, and wherein the uninterruptible power supply includes the battery.

6. The uninterruptible power supply of claim 1, wherein the controller is further configured to modify the second voltage based on the updated profile.

7. The uninterruptible power supply of claim 1, wherein the output is configured to provide AC output power to the load.

8. A method for controlling an uninterruptible power supply having a first input configured to receive input power from a first power source, a second input configured to receive input power from a second power source, an output configured to provide output power to a load derived from power from at least one of the first power source and the second power source, the method comprising:
in a first mode of operation, controlling the uninterruptible power supply to provide an output voltage of the output power at substantially a first voltage level;
generating a profile of the load;
in a second mode of operation, controlling the uninterruptible power supply to provide an output voltage at substantially a second voltage level, with the second voltage level being less than the first voltage level;
setting the second voltage level based on the generated profile;
detecting that a capacity of the load has changed by a threshold amount; and in response to the detection, generating an updated profile of the changed load.

9. The method of claim 8, further comprising providing power at the output derived from the second power source in the second mode of operation.

10. The method of claim 9, further comprising providing power at the output derived solely from the first power source in the first mode of operation.

11. The method of claim 8, wherein generating a profile includes:
    outputting a nominal voltage to the load;
    changing the nominal voltage by a known amount; and
    detecting a change in current drawn by the load.

12. The method of claim 8, wherein the second power source is a battery, and wherein the method further includes providing power to the load solely from the battery in the second mode of operation.

13. The method of claim 8, further comprising modifying the second voltage based on the updated profile.

14. The method of claim 8, wherein controlling the uninterruptible power supply to provide the output voltage at the first and second voltage levels further involves providing AC output voltages at the first and second voltage levels.

15. An uninterruptible power supply (UPS) system comprising:
    a first input configured to receive input power from a first power source;
    a second input configured to receive input power from a second power source;
    an output configured to provide output power to a load derived from power from at least one of the first power source and the second power source;
    means for detecting a profile of the load;
    means for controlling an output voltage of the UPS system including means for detecting that output power is being provided by the second power source, and in response, reducing an output voltage of the UPS system to a reduced voltage level based on the profile of the load;
    means for detecting a change in a characteristic of the load and updating the profile of the load based on the change.

16. The UPS of claim 15, wherein the second power source is a battery, and the UPS includes the battery.

17. The UPS system of claim 15, wherein the output is configured to provide AC output power to the load.

* * * * *